3,429,902
PROCESS FOR PURIFYING STEARIC ACID
Samuel Serota, Philadelphia, and Harold E. Kenney, Chalfont, Pa., assignors to the United States of America as represented by the Secretary of Agriculture
No Drawing. Filed Sept. 10, 1965, Ser. No. 486,570
U.S. Cl. 260—419                      3 Claims
Int. Cl. C07c 53/22; C11c 1/08; B01d 9/00

ABSTRACT OF THE DISCLOSURE

Stearic acid is purified by crystallization at ambient room temperatures from a solvent mixture consisting of about 97–96% petroleum ether and about 3–4% methylene chloride. The process eliminates the need for low-temperature crystallizations and large volumes of solvent.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to purification of stearic acid.

Stearic acid is obtained from natural sources where it occurs as one of a mixture of fatty acids. Typical commercially available stearic acid contains about 5% palmitic acid and about 1% of a mixture of saturated and unsaturated fatty acids having chain lengths of fourteen to twenty-two carbon atoms. A considerably purer stearic acid product is desirable for use in preparative work and in reaction studies of stearic acid where the identification and isolation of the reaction products is complicated by the presence of impurities. The removal of most of the impurities from stearic acid facilitates interpretation of results when components of reaction mixtures are resolved by techniques such as thin-layer chromatography and gas-liquid chromatography.

A method currently used for obtaining pure (98–99%) stearic acid is repeated crystallization from acetone at temperatures in the range of −20 to 0° C. This procedure is time consuming, usually two days or longer, requires special facilities, and involves working in a rather disagreeable environment. Another procedure in use for many years includes preparation of methyl esters of the mixture of fatty acids, distillation of the esters in a fractionation column with high numbers of theoretical plates to separate methyl stearate, and finally, saponification of the ester and crystallization of the stearic acid. The process is costly and lengthy, usually requiring several days.

An object of the present invention is to provide a rapid procedure for purification of stearic acid.

Another object is to provide a procedure which produces a purification of stearic acid comparable to that obtained by the most practical previously available method.

Other objects and a fuller understanding of the invention will be apparent from the following specification and claims.

According to the present invention stearic acid containing other fatty acids is purified by crystallization from a solvent mixture consisting of about 97–96% by volume redistilled petroleum ether and about 3–4% by volume methylene chloride.

Petroleum ether is a volatile fraction of petroleum containing mostly pentanes and hexanes and typically the commercially available products designated as "petroleum ether" are fractions having a boiling point range of about 30–60° C. The particular boiling point range of the petroleum ether used is not critical to the invention, but the commercial product should be redistilled to remove trace amounts of high boiling, "oily," impurities.

Petroleum ether is a poor solvent for stearic acid, and, when used as such, is inefficient and impractical for purposes of purification. Methylene chloride is such a good solvent for most of the fatty acids that it is not suitable for recrystallization of stearic acid.

The combination of about 3 to 4% by volume of methylene chloride with petroleum ether, however, not only provided an excellent solvent for recrystallizing stearic acid, but, at ambient (room) temperatures, retained in solution on the first recrystallization a major portion of the other fatty acids contained in commercial grade stearic acid. Subsequent recrystallizations from the solvent removed a progressively smaller proportion of impurities, but three crystallizations gave a product of 98.5–99% stearic acid. The purified stearic acid can thus by obtained in just a few hours instead of several days.

Since the operativeness of the present process indicates that the impurities in commerical grade stearic acid are more soluble in the petroleum ether-methylene chloride solvent than the stearic acid, the primary consideration is to prepare a solution saturated with stearic acid at a temperature above that to which the mixture will be cooled or allowed to cool for collection of crystallized stearic acid.

The desired collection temperature is ambient (room) temperature, typically about 21–24° C. Accordingly, the volume of solvent needed is that at least sufficient to dissolve all the stearic acid at the temperature above ambient to which the mixture is heated. Typically, a volume of solvent having a ratio of about 6–8 times the weight of stearic acid (a weight ratio of solvent to stearic acid in the range of about 5:1 to 6:1) was used with good results.

Somewhat lower ratios of solvent may be used, with a decreased retention of stearic acid in the mother liquor, but purification is less efficient. Higher ratios may also be used, but purification is not markedly enhanced and yield of stearic acid is lowered.

As the process of the present invention is typically conducted at existing atmospheric pressure, the upper limit of heating is the temperature at which the mixture boils. Heating to temperatures intermediate ambient temperature and the boiling point temperature are also operative, but with reduced yield of stearic acid.

The following example is for purposes of illustrating the practice of the invention and is not intended to be in limitation thereof.

Example 1

Two kilograms of a commercial stearic acid product containing 94% stearic acid, 4+% palmitic acid, and the remainder a mixture of $C_{14}$, $C_{20}$ and $C_{22}$ fatty acids, was combined with 16.5 liters of a solvent consisting of 16.0 liters redistilled petroleum ether (B.P. 38–55° C.) and 0.5 liter methylene chloride. The fatty acid-solvent mixture was heated until all the fatty acids were in solution. The solution was allowed to cool to room temperature, about 23° C. The resulting solid mass of crystals was broken up by vigorous stirring with a wooden paddle. The crystals were collected by filtration and the filter cake rinsed with cold petroleum ether. The cakes were removed triturated with cold petroleum ether and again collected by filtration. Yield: 1800 grams by weight.

The 1800 grams was crystallized from about 15 liters of the same solvent mixture in a manner similar to the first crystallization except that it was a very hot day and room temperature was about 30–32° C. during the filtering, washing and triturating steps and yield was only 1200 grams. The dry silvery flakes were indicated by gas-liquid chromatography to be 98% stearic acid.

The twice crystallized product was recrystallized from 7.75 liters solvent (7.50 liters redistilled petroleum ether, 0.25 liter methylene chloride), filtered, the filter cake triturated with cold petroleum ether, and the crystals collected and air-dried. The large silvery plates, weight 950 grams, had a melting point of 70–71° C. and analyzed 98.7% stearic acid, comparable in purity to the best products obtained by low temperature recrystallizations from acetone.

Although the example describes purification of a commercially available stearic acid product, the highly selective action of the inventive solvent mixture permits the application of the present process to a variety of other fatty acid mixtures containing stearic acid to obtain purified stearic acid.

We claim:
1. A process for purifying 94% stearic acid comprising crystallizing stearic acid from a solvent consisting of about 97–96% by volume redistilled petroleum ether and about 3–4% by volume methylene chloride.
2. A process for the further purification of a 94% stearic acid product containing other fatty acids comprising heating a first 94% stearic acid product in a sufficient volume of a solvent consisting of about 97–96% by volume redistilled petroleum ether and about 3–4% by volume methylene chloride to dissolve all of said stearic acid product at a temperature above ambient to obtain a solution of stearic acid and other fatty acids in said solvent, allowing said solution to cool to ambient temperature, and separating solids from the cooled solution to obtain a second product enriched in respect to stearic acid content.
3. The process of claim 2 in which the first stearic acid product is a mixture of fatty acids containing about 98% stearic acid.

References Cited

Jordan, Technology of Solvents (1932), pp. 214–15, TP 247.5 J 62.

Morton, Laboratory Technique in Organic Chemistry (1938), pp. 148–49, QD 261 M 74.

ALEX MAZEL, *Primary Examiner.*

J. A. NARCAVAGE, *Assistant Examiner.*